United States Patent [19]
Andrejco et al.

[11] Patent Number: 5,198,270
[45] Date of Patent: Mar. 30, 1993

[54] METHOD OF FORMING A FIBER PREFORM WITH DOPANTS DISSOLVED IN A LIQUID

[75] Inventors: Matthew J. Andrejco, Clinton; Brian G. Bagley, Watchung, both of N.J.

[73] Assignee: Bell Communications Research, Inc., Livingston, N.J.

[21] Appl. No.: 789,734

[22] Filed: Nov. 8, 1991

[51] Int. Cl.$^5$ .......................... B05D 7/22; B05D 5/06; B05D 3/02
[52] U.S. Cl. .................................... 427/230; 427/163; 427/226; 427/376.2; 427/397.7; 427/164
[58] Field of Search ............... 427/163, 226, 230, 238, 427/376.2, 397.7, 164; 65/3.11, 3.41, 3.44

[56] References Cited

U.S. PATENT DOCUMENTS

| | | | |
|---|---|---|---|
| 4,217,027 | 8/1980 | MacChesney et al. | 350/96.3 |
| 4,334,903 | 6/1982 | MacChesney et al. | 65/3.12 |
| 4,835,057 | 5/1989 | Bagley et al. | 428/391 |
| 4,885,186 | 12/1989 | Bagley et al. | 427/38 |

FOREIGN PATENT DOCUMENTS 0025230 3/1981 European Pat. Off. .

OTHER PUBLICATIONS

J. B. MacChesney et al., "A New Technique for the Preparation of Low-Loss and Graded-Index Optical Fibers," *Proceedings of the IEEE*, 1974, vol. 62, pp. 1280–1281.

J. E. Townsend et al., "Solution-doping technique for fabrication of rare-earth-doped optical fibres," *Electronics Letters*, 1987, vol. 23, pp. 329–331.

M. A. Saifi et al., "$Er^{3+}$-doped $GeO_2$—CaO—$Al_2O_3$ silica core fiber amplifier pumped at 813 nm," *Technical Digest, OFC '91*, 1991, p. 198.

B. G. Bagley et al., "Dielectric and high $T_c$ superconductor applications of Sol-Gel and modified Sol-Gel processing to microelectronics technology." *Journal of Non-Crystalline Solids*, 1990, vol. 121, pp. 454–462.

Primary Examiner—Shrive Beck
Assistant Examiner—David M. Maiorana
Attorney, Agent, or Firm—Leonard Charles Suchyta; Charles S. Guenzer

[57] ABSTRACT

A method of forming an optical fiber. A solution (12) is prepared in which are dissolved both a ladder siloxane and one or more dopants which are to be incorporated into the final silica or silicate glass. The solution is drawn into the interior of a silica tube (10) and is left as a coating (26) on the inside wall. The solvent is evaporated, and the rigid coating is cured at 150° C. The filling and curing process may be repeated for multiple layers. The cured coating is then oxidized and fused into doped silica. The resultant tube preform is collapsed and drawn into a fiber. The method allows the introduction of nearly arbitrary constituents into the silica, including glass-forming elements and low-level dopants. The core-cladding interface is improved if a layer of glass-forming soot particles (28) is first deposited and the liquid is soaked into and over the soot.

13 Claims, 2 Drawing Sheets

METHOD OF FORMING A FIBER PREFORM WITH DOPANTS DISSOLVED IN A LIQUID

FIELD OF THE INVENTION

The invention relates generally to optical fibers. In particular, the invention relates to a method of forming the preform for the fiber in which an inside layer is formed from a liquid.

BACKGROUND ART

The technology is well developed for fabricating optical fibers, particularly optical fibers made of silica. The dominant process deposits a soot or other material inside a silica tube by CVD (chemical vapor deposition) or flame hydrolysis. The CVD process is disclosed by MacChesney et al. in "A New Technique for the Preparation of Low-Loss and Graded-Index Optical Fibers," *Proceedings of the IEEE*, volume 62, 1974, pp. 1280-1281 and in U.S. Pat. Nos. 4,217,027 and 4,334,903. The soot is then fired so as to form a thin uniform glassy layer of silica on the inside of the tube. This structure is referred to as the preform tube. The innermost silica, for transmission fiber, is doped with small amounts of dopants so that the inside layer has a slightly higher index of refraction than the tube itself. The preform tube is then heated so that it collapses to form a solid cylindrical preform rod, which is subsequently drawn so as to form a fiber. The central portion originating from the inside silica layer is the fiber core. The surrounding portions originating from the silica tube form the cladding and other layers. Such a silica fiber can be made as a single-mode fiber nearly transparent for radiation in parts of the 1.3 to 1.5 $\mu$m wavelength band. Hence, such silica fibers have been widely implemented in telecommunications systems.

Residual absorption, however, does remain in silica fibers so that long telecommunication fibers, for example, greater than tens or hundreds of kilometers, require amplification of the original optical signal levels on the fibers. Until recently, a practical optical amplifier did not exist that could be combined with an optical fiber and therefrom the optical signal was regenerated, requiring conversion to an electrical signal.

However, a practical optical amplifier has been recently developed. The core of a silica fiber is doped with rare-earth $Er^{3+}$ ions. If a short length of such a fiber carries both the modulated optical data signal at ~1.55 $\mu$m and an unmodulated optical pump signal at ~0.8, 0.98, or 1.48 $\mu$m, then the data signal is optically amplified. Such an erbium amplifier can easily be made into a fiber laser. Townsend et al. disclose a method of fabricating an erbium-doped fiber in "Solution-doping technique for fabrication of rare-earth-doped optical fibers," *Electronics Letters*, volume 23, 1987, pp. 329-331. They first deposit the core as an unsintered porous soot. Thereafter, an aqueous solution containing an erbium salt soaks into the soot, the aqueous solution being hydrolyzed. However, hydrolysis in an optical fiber layer introduces residual hydroxyl ions, which cause substantial absorption. More recently, the Er-doped glass has been modified by various combinations of the glass-formers Ge, P, and Al. Saifi et al. have disclosed co-doping with Ca, Al, Ge, and Er in "$Er^{3+}$-doped $GeO_2$—CaO—$Al_2O_3$ Silica Core Fiber Amplifier Pumped at 813 nm," *Technical Digest*, OFC '91, 1991, p. 198. They soak a sooty inside CVD-deposited core layer with an ethanol solution in which are dissolved $ErCl_3$, $Al(NO_3)_3$, and $Ca(NO_3)_2$ so as to form a calcium aluminum silicate core doped with Er and Ge. Such a glassy core improves small-signal gain when pumped at 800 nm. Even the best erbium-doped fiber amplifiers suffer disadvantages. Their gain spectrum is relatively narrow and uneven and cannot be moved to other parts of the infrared spectrum. Hence, other optically active ions are being investigated.

Doping silica cores with Er and other unusual elements presents a problem. The usual CVD fabrication techniques require that the dopants be available as gases or at least vaporizable liquids. Such sources are not readily available for such elements as Mg, Ba, Ca, Zr, and Pb.

Furthermore, optical fibers are needed that have a large numerical aperture, which is obtained by a large difference in the refractive index between the core and cladding. However, incorporating large amounts of dopants in the core by the gaseous-phase processes of CVD or flame hydrolysis is generally difficult.

SUMMARY OF THE INVENTION

Accordingly, an object of the invention is to provide a method of forming an optical fiber preform that does not limit the type or concentration of dopant to be incorporated into the core layer.

The invention can be summarized as a method of forming an optical fiber preform in which an organosilicon polymer is dissolved in an organic solvent in which the desired dopants are also soluble in some form, e.g., as salts. The inside of a silica tube is then coated with the solvent and dissolved constituents and drained to leave a thin film of adhering fluid. After the solvent is evaporated to leave a coating of doped siloxane polymer, the siloxane is oxidized to form silica with embedded dopants.

DETAILED DESCRIPTION

According to the invention, one or more precursors of the core layer are deposited inside a silica tube from a liquid phase. The liquid includes a solvent in which are dissolved both the desired precursors and an organosilicon polymer. The liquid naturally adheres to the silica tube. The solvent is allowed to evaporate leaving a siloxane polymer incorporating the precursors or elemental parts of them. The inside coated tube is then heat treated at a fairly low temperature, that is, cured, to render it stable and insoluble in organic solvent. After curing, the tube is subjected to a high temperature heat treatment so as to oxidize and consolidate the coating into a glass, thus completing the preform having a glassy silicate layer with the desired additional constituents formed inside the silica tube.

Figure 1:
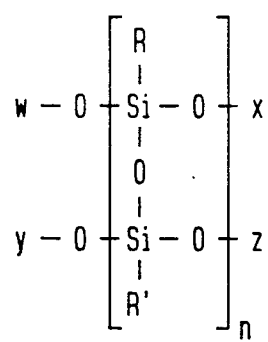
FIG. 1 is a structural representation of an organosilsesquioxane polymer.

One preferred organosilicon polymer is organosilsesquioxane polymer (also known as ladder siloxane), the structural formula for which is illustrated in FIG. 1. In the formula R and R' may be the same and are selected from the group consisting of (a) aliphatic hydrocarbons of 1 to 4 carbon atoms, (b) a phenyl radical,
(c) a phenyl radical substituted with hydroxy or halogen groups, and
(d) a halogen group, provided that R and R' are not both halogens.

Further, w, x, y, and z are functional groups selected from the group consisting of alkoxy groups of 1 to 4 carbon atoms, halogen atoms, hydroxyl groups and silanol groups. The length of the polymer is determined by n which is an integer, greater than one, preferably ranging from 10 to 200.

Bagley et al. have suggested using undoped ladder siloxanes in forming a fiber waveguide cladding in U.S. Pat. Nos. 4,835,057 and 4,885,186, both incorporated herein by reference. They have disclosed further uses of the ladder siloxanes in "Dielectric and high $T_c$ superconductor applications of sol-gel and modified sol-gel processing to microelectronics technology," *Journal of Non-Crystalline Solids*, volume 121, 1990, pp. 454–462.

The inventive method was applied to preparing a number of exemplary fibers having a glassy core of calcium aluminum silicate (Ca—Al—$SiO_2$) free of $GeO_2$ and having an index of refraction slightly larger than that of the cladding. We will refer to any glass as a silicate that contains Si and O as principal constituents, for example, above 1 atomic percent. This definition includes pure silica. Constituents of less than this percentage will be referred to as low-level dopants, which may be incorporated into silicate glasses for their optical activity or other effect. Other organosilicon polymers may be used with the invention, for example, linear siloxanes, even though they are rubbery at room temperature and have a lower density.

EXAMPLE 1

Figure 2:
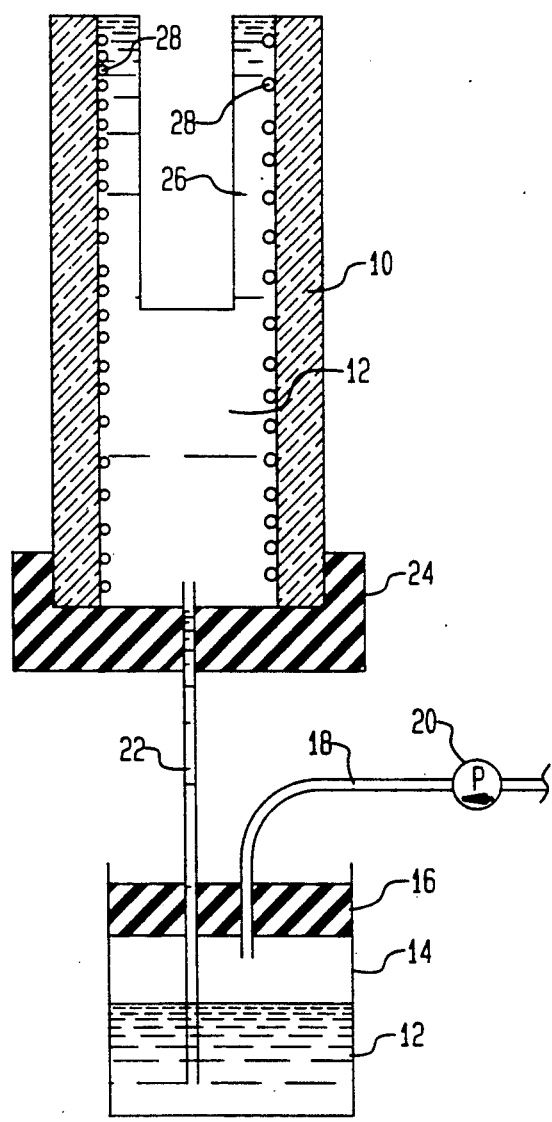
FIG. 2 is a cross-sectional view of a method of practicing the invention.

A pure $SiO_2$ glass waveguide tube 10, illustrated in the cross-sectional view of FIG. 2, was used as the substrate for subsequent growth. It had a length of 150 mm, an inside diameter of 16 mm, and a outside diameter of 20 mm. Such tubes are available from Heraeus-Amersil, Inc.

A solvent was prepared from a solution of ethanol and butanol (50:50, by volume). Then, 0.5 mole of Al($NO_3$)$_2$ and 0.25 mole of Ca($NO_3$)$_2$ were dissolved in the solvent. The amounts were chosen so that the the Al/Ca ratio was 2:1 to ensure that the Al ions in the glass would occupy the tetrahedral sites, that is, be tetrahedrally coordinated so as to minimize Rayleigh scattering.

To provide the silica ($SiO_2$) host, a ladder siloxane was dissolved in the solution in the amount of 40 weight percent relative to the Al($NO_3$)$_3$ and Ca($NO_3$)$_2$. The ladder siloxane was OI-NEG resin GR 150 available from OI-NEG, Inc. It has methyl and phenyl pendant groups for R and R', and functional groups ethoxy and hydroxy for w, x, y, and z. This ladder siloxane is advantageous in having a glass transition temperature above room temperature so that it is rigid at ambient temperatures.

About 20 ml of a precursor solution 12 was prepared which contained the siloxane and precursors of the glass forming Ca and Al but not the erbium salt. The precursor solution 12 was immediately filled into a bottle 14. The bottle 14 was sealed with a stopper 16. A first flexible tube 18 was connected to an air pump 20 and passed through the stopper 16 so as to pressurize the inside of the bottle 14. A second flexible tube 22 passed through the stopper 16 to nearly the bottom of the filled bottle 14 and also passed through a seal 24 snugly fitting around the bottom of the vertically set tube 10. When the pump 20 was turned on, the precursor solution 12 filled the tube 10 to its top. The pressure was slowly released so if it the precursor solution 12 slowly drained out the bottom for about three minutes. However, a thin liquid film 26 was left adhering to the inside of the tube 10. No additional agents were required to give the precursor solution a convenient viscosity.

The seal 24 was removed, and the tube 10 was left to dry in ambient laboratory environment for 15 minutes so that the ethanol/butanol solvent evaporated, leaving a rigid, solid film on the tube interior. The entire tube 10 was heated treated at 150° C. inside a diffusion furnace in stagnant air for 15 minutes in order to cure the coating. At the end of curing, the coating was no longer soluble in organic solvents. Curing is not required if only a single liquid coating is applied. A dry atmosphere (air or oxygen) would have preferably been kept in the tube's interior during the filling and curing.

The coating and curing steps were then repeated to thereby grow a double layer of siloxane containing the Ca, Al, and, if they were used, Er precursors.

The siloxane coating was oxidized and fused (sintered) by one pass of a oxy-hydrogen torch moving axially along the tube at the rate of 100 mm/min while the tube was rotating and pure oxygen was flowing through the tube's interior. The torch was fed oxygen at the rate of 30 l/min and hydrogen at 60 l/min. An optical pyrometer indicated that a temperature of about 2000° C. was reached. This step completed the formation of the tube preform in which the inside layer was a glass of calcium aluminum silicate.

Then ten additional passes of the oxy-hydrogen torch were performed on the slightly overpressured tube preform in conjunction with standard preform processing techniques to collapse the inside-coated tube into a solid rod preform. With standard fiber drawing techniques, the rod preform was then drawn into a fiber having a diameter of 125 µm.

The profile of refractive index across a diameter of the resultant fiber was then measured using a York FCM 1000 Fiber Characterization System. The index profile showed a core having a diameter of 5.7 µm and a refractive index that was 0.0032 higher than that of the cladding, that is, of the $SiO_2$ tube.

EXAMPLE 2

A second fiber was formed similarly to Example 1. However, to demonstrate that the composition of the core, and thus the step in refractive index, could be controlled, an additional 10 cc of the Ca—Al dopant solution was added to the precursor solution of Example 1. Also, prior to the 2000° C. sintering, the torch performed an 850° C. pass along the siloxane-coated tube in order to oxidize the siloxane into silicate particles. The resulting rod preform showed very high visual quality. When it was drawn into a fiber having a diameter of 125 µm, the core had a diameter of 5.9 µm and showed an index step of 0.0042 above the tube. This control of the index step is important in controlling the numerical aperture (NA) of the fiber.

EXAMPLE 3

A third fiber was formed similarly to Example 2. However, its core was doped with Er so that it could act as an optical amplifier. Also, prior to any liquid coating, a partial cladding layer of F-doped silica was deposited inside the tube 10 using twenty passes of conventional CVD having a standard depressed index composition of $SiO_2$. This number of passes was chosen so as to yield the proper cladding-to-core diameter ratio. The soot 28, if used, was not fired.

A first siloxane layer was coated using the precursor solution of Example 2, that is, containing Ca and Al precursors, and it was then cured. A second precursor solution was prepared containing the same amounts of the Ca and Al precursors but also containing Er precursors. Specifically, a 0.0035 mole equivalent of the hydrated erbium salt $ErCl_3.6H_2O$ was dissolved in the solvent, and the coating and curing steps were repeated for the second precursor solution. There resulted a solid and rigid inside coating of siloxane interspersed with Al and Ca and partially interspersed with Er. After curing, the rigid siloxane was oxidized with a 850° C. pass of the torch and then sintered with a 2000° C. pass. The tube preform was then collapsed into a rod preform, which was drawn into a fiber having a diameter of 125 μm.

A measurement of the refractive index showed that the core had a diameter of 4.47 μm and was surrounded by an inner cladding of depressed refractive index, resulting from the conventional CVD. The refractive index of the inner cladding was smaller than that of the core by 0.0046 and of by tube substrate by 0.0016. The profile, however, was not smooth, and large scattering was expected at the core-cladding interface.

The CVD deposition could be avoided by coating the liquid to the inside of silica tubes predoped with F that are available from Heraeus-Amersil.

EXAMPLE 4

In a fourth example, a large amount of Er was incorporated only into the central portion of the core. Conventional CVD was used to deposit on the inside of the tube twenty-two layers of a depressed cladding and one core layer of $SiO_2$ doped with $GeO_2$. The layers were fused. Another similar doped core layer was conventionally deposited at a low enough temperature as to leave a thin porous layer. By use of the liquid coating technique, a precursor solution coated into and over the porous layer. The precursor solution was 20 cc of 40 wt % GR 150 in (50:50) butanol-ethanol solvent combined with 60 cc of 0.45M $Al(NO_3)_3$ and 0.05M $ErCl_3$ in the (50:50) butanol-ethanol. The coated tube was dried vertically for 30 minutes, heat treated for 15 minutes at 150° C., and heat treated again for 30 minutes at 750° C. The fusion, collapsing, and drawing were performed as before.

Figure 3:
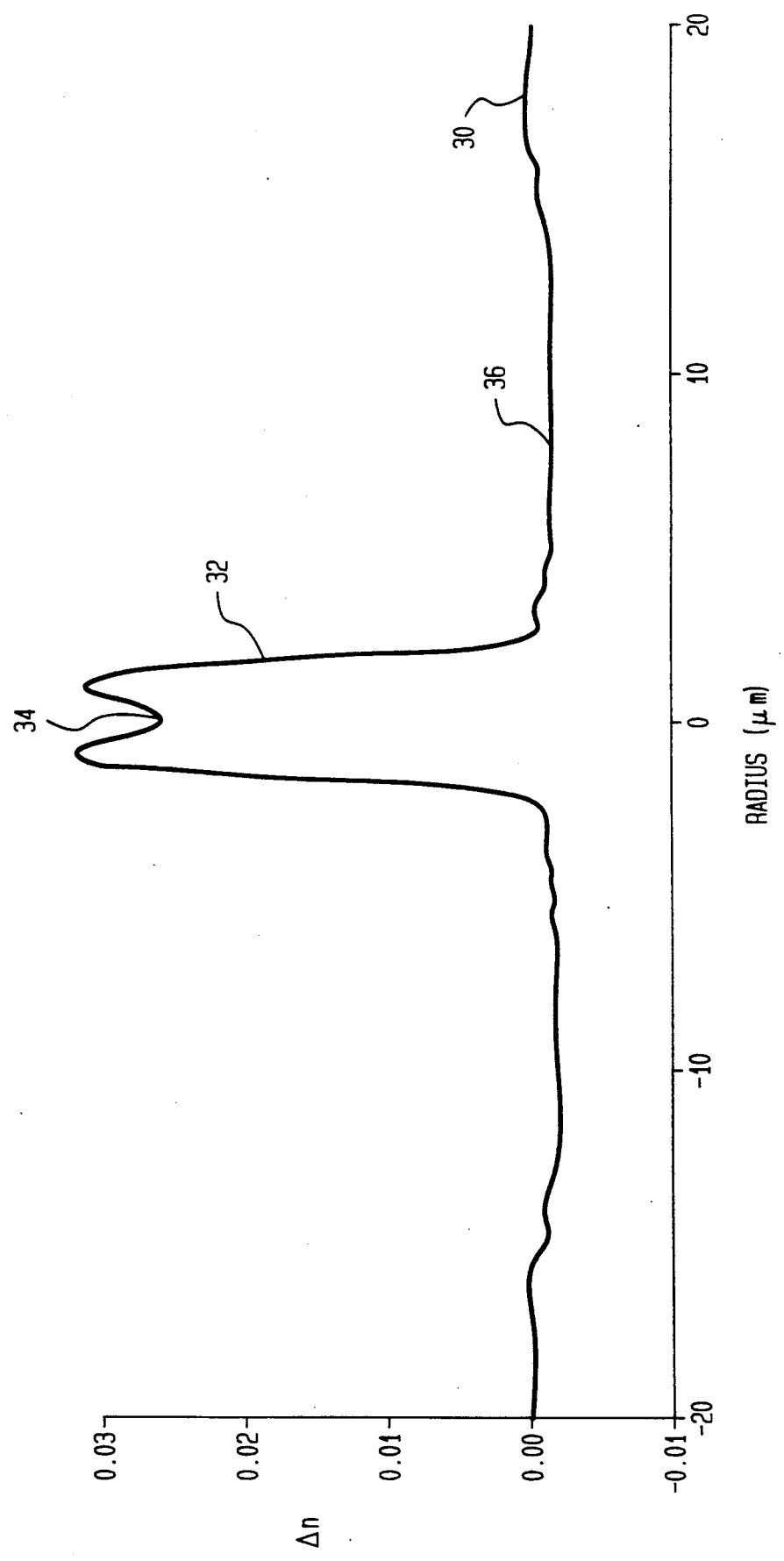
FIG. 3 is a graph of the refractive index profile of an optical fiber fabricated according to the invention.

A portion of the measured refractive index difference $\Delta n$, relative to the refractive index of the $SiO_2$ of the substrate tube 30, is illustrated in the graph of FIG. 3. A central peak 32 represents the doped core having a diameter of 3.98 μm and having a central dip 34 representing the Er doping. Surrounding the doped core 32 is an inner cladding layer 36 of depressed refractive index, which resulted from the conventional chemical vapor deposition. The fiber diameter was 125 μm. The refractive index of the doped core 32 was larger than that of the inner cladding layer 34 by 0.0294. Its numerical aperture was 0.295. The fiber showed strong absorption at 1.53 μm, as would be expected from the Er doping. When it was pumped at 1.46 μm, it strongly fluoresced at 1.53 μm.

The above examples demonstrate that the invention allows two types of dopants to be introduced into the silicate glass. The high-density dopants are glass formers and modifiers and are principal constituent parts of the silicate glass and thus are dissolved in the solvent as glass precursors. The low-density dopants form color centers or other isolated states in the glass and thus are dissolved as dopant precursors. Many important dopants are cation dopants which are incorporated into the silicate glass as positively charged ions. Salts of such cation dopants can usually be found which will dissolve in some solvent which also dissolves the siloxane polymer. In some cases, the solvent may dissolve the dopants in their elemental form so that they form their own precursors. Thereby, the invention allows the use of dopants not previously capable of being incorporated into silicate fibers formed by conventional CVD methods.

The process is advantageous over sol-gel processes in that it can use anhydrous organic solvents, such as the ethanol and butanol of the examples, thereby avoiding aqueous solvents which introduce undesirable hydroxyl ions in the fiber.

The invention involves a simple process. It avoids hazardous gas sources for unusual dopants. The liquid coating is economical because it avoids much of the gas handling equipment required in CVD or flame hydrolysis. It is accurate because the compositions of the liquid coatings can be closely controlled. Further, it allows the incorporation into the glass of elements not previously practically feasible.

What is claimed is:

1. A method of fabricating a silicate fiber preform, comprising the steps of:
    preparing a liquid precursor solution comprising a solvent, an elemental precursor soluble in said solvent, and an organosilicon polymer soluble in said solvent, said elemental precursor comprising an element for modification of a composition of a silicate glass formed at least partially from said organosilicon polymer;
    coating an inside of a silicate tube with said liquid precursor solution to thereby form a liquid coating; and
    oxidizing and fusing said coating at an elevated temperature to thereby form said silicate glass.

2. A method as recited in claim 1, wherein said organosilicon polymer comprises an organosilsesquioxane polymer.

3. A method as recited in claim 1, wherein said elemental precursor comprises a salt of said element.

4. A method as recited in claim 1, wherein said elemental precursor comprises a dopant precursor for incorporation into said silicate glass as a dopant element.

5. A method as recited in claim 4, wherein said dopant element comprises erbium.

6. A method as recited in claim 4, further comprising depositing a sooty layer of silica particles on said inside of said silicate tube and wherein said liquid precursor solution is coated on said sooty layer.

7. A method as recited in claim 1, wherein said elemental precursor comprises at least one glass precursor, said glass precursor providing at least one major elemental constituent of said silicate glass.

8. A method as recited in claim 7, wherein said at least one major elemental constituent comprises Ca and Al.

9. A method as recited in claim 7, wherein said precursor solution further comprises a second elemental precursor soluble in said solvent and for incorporation in said silicate glass as a dopant element.

10. A method as recited in claim 1, further comprising the steps of:
evaporating said solvent to leave a solid coating; and
hardening said solid coating prior to said oxidizing and fusing step.

11. A method as recited in claim 1, further comprising the steps of:
preparing a second precursor solution comprising said solvent, a second elemental precursor soluble in said solvent, and said organosilicon polymer, said second elemental precursor comprising a second element for incorporation into a second silicate glass formed at least partially from said organosilicon polymer;
hardening said coating;
coating said hardened coating with said second precursor solution to thereby form a second coating; and
then performing said oxidizing and fusing step including oxidizing and fusing said second coating.

12. A method as recited in claim 1, further comprising collapsing said silicate tube formed with said silicate glass.

13. A method as recited in claim 12, further comprising drawing said collapsed tube into a fiber.

* * * * *